Sept. 7, 1937.   W. G. LANE   2,092,316
OIL WELL FISHING MAGNET
Filed Oct. 21, 1933   2 Sheets-Sheet 2

Wilfred G. Lane
INVENTOR

Patented Sept. 7, 1937

2,092,316

UNITED STATES PATENT OFFICE 2,092,316

OIL WELL FISHING MAGNET

Wilfred G. Lane, Los Angeles, Calif., assignor to The Technicraft Engineering Corporation, Los Angeles, Calif., a corporation of California Application October 21, 1933, Serial No. 694,603

5 Claims. (Cl. 294—65.5)

This invention relates to a method and apparatus for recovering pieces of magnetizable material from wells of great depth, and that may be filled with fluids such as water, oil and rotary mud. The apparatus described has proved to be of great utility when used for this purpose, and has accomplished results not heretofore attainable.

Heretofore, a great many attempts have been made to construct devices which would consistently remove loose pieces such as lugs, slips, bit parts, etc., from a well containing fluid, but so far none of the attempts have been successful or practical. I have a new and novel tool for this purpose, the construction and operation of which is extremely simple, and yet positive results are obtained. Attempts have been made to lower a source of energy into a well, such as wet or dry batteries, but due to temperature changes and the problem of getting rid of the gases from the batteries under great fluid pressure, the length of time involved in running the device in and out of the bore hole depleting the supply of energy, the keeping of the interior of the devices dry due to leakage under great pressures, and the grief encountered by the twisting and tangling of two lines lowered into a well at the same time, have proved all previous devices not practical or positive in operation. I have overcome all of these difficulties and have provided a magnet with the maximum pull capacity for the allowable diameter, and therefore able to recover loose pieces or "fish" with extreme ease. I have also provided means for telling at the surface of the ground exactly what my tool is doing, without the delay occasioned by many round trips to observe results. I have provided means for determining exactly when my magnet touches an obstruction in a well, and means for determining at the surface whether the obstruction is magnetic or nonmagnetic, and exactly at what depth it has been reached. I am also able to check my mechanical measurement of depth by electrical apparatus and be doubly sure of my results.

The object of my invention therefore is to provide a magnetic fishing tool, simple in construction, easy to operate under all well conditions, and yet observe at the surface of the ground exactly what the tool is doing in the hole and where it is being done. I have elected to show a preferred embodiment of my invention, but many changes may be made in detail without changing from the fundamentals involved.

Figure 1:
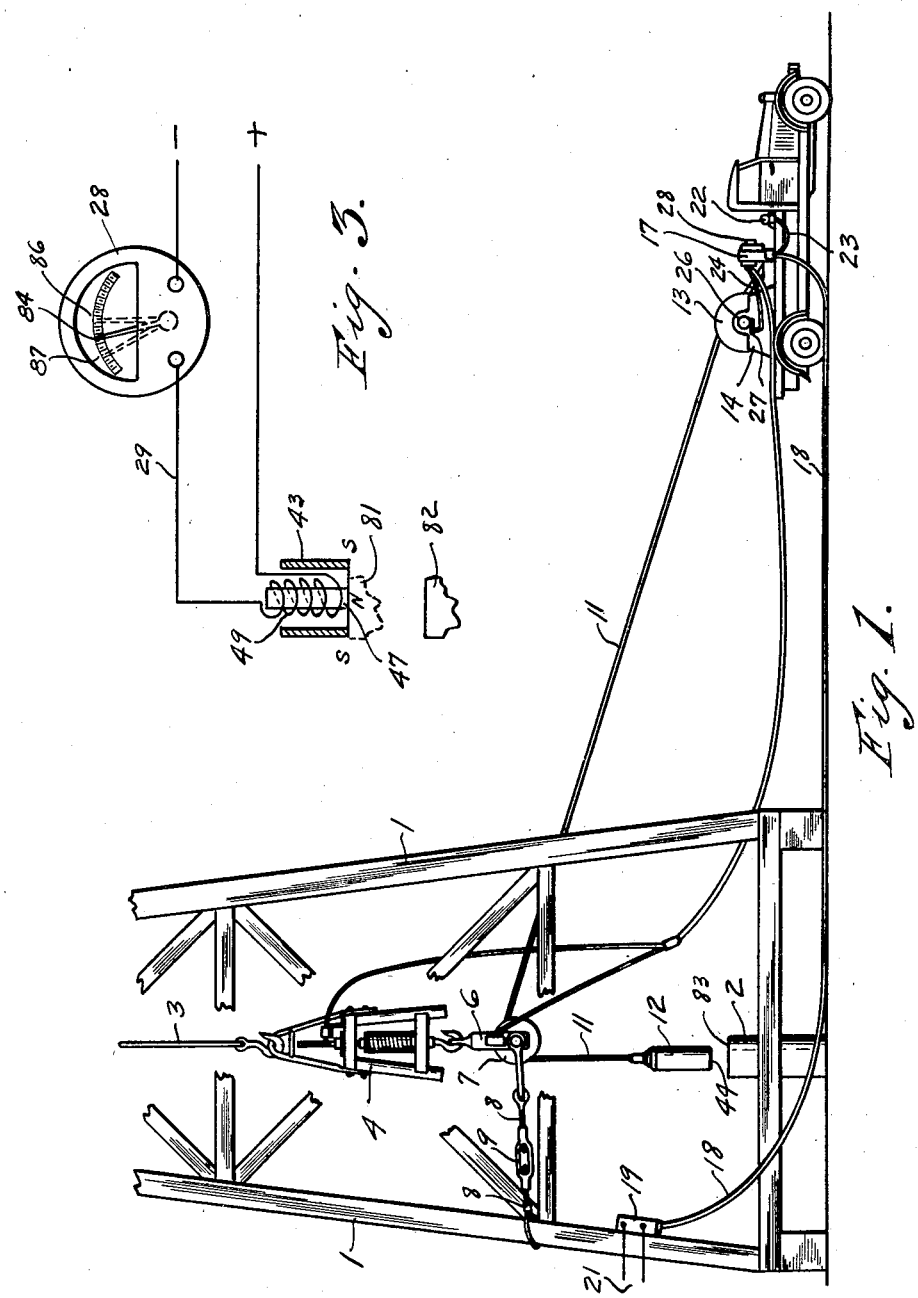

In the accompanying drawings, Fig. 1 shows the general arrangement of the apparatus in use, the magnetic tool suspended over the well, and the weight indicator and depth measuring device.

Figure 2:
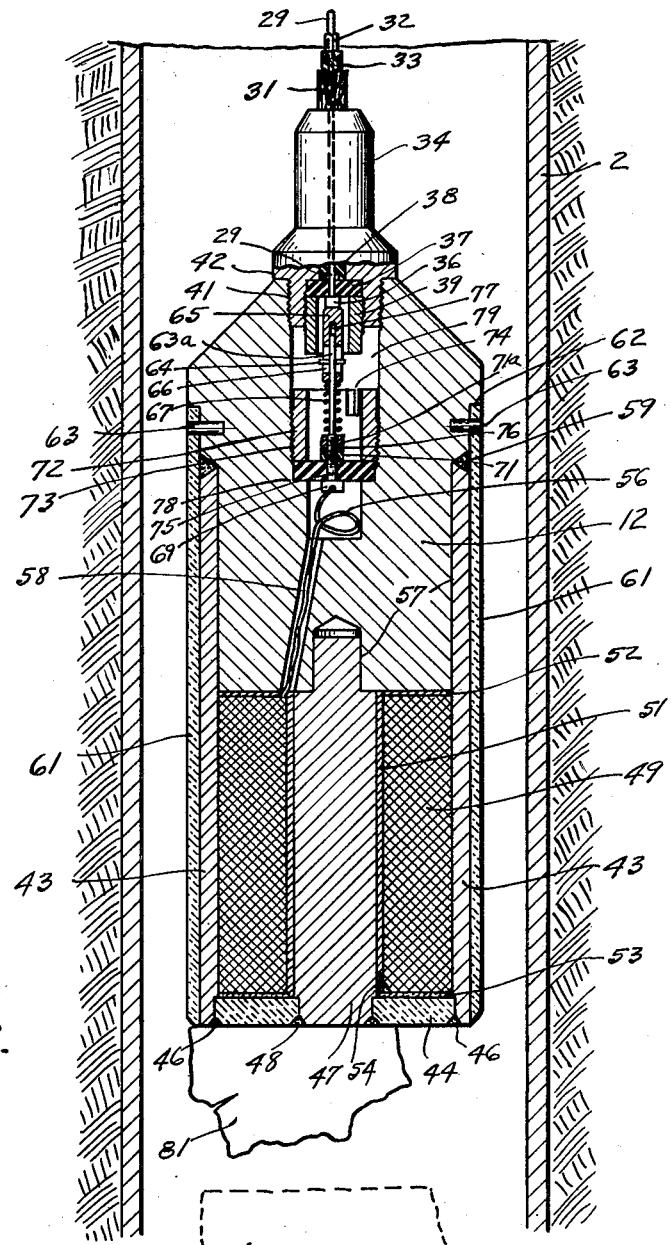

Figure 2 shows in section the construction of my magnetic tool, and Fig. 3 shows diagrammatically the manner I determine contact with a fish, or tell when the fish might be lost.

In Fig. 1, the usual derrick is shown at 1 over a well 2 with a suspending cable 3, carrying the weight indicator 4, and the measuring device 6, with sheave wheel 7, operating on a shaft, and guyed in the derrick 1 with rods 8 and turnbuckle 9. Cable 11 operates over sheave 7, and has suspended from one end magnet 12, with the other end reeled on the drum 13 of a hoist 14 mounted on a truck. Also mounted on the truck is a switchboard panel 17, connected to a source of alternating current 21 through cable 18 to panel box 19. The truck also carries a motor generator set 22 connected to panel 17 by cable, which carries a source of alternating current to the motor and direct current from the generator to panel 17. Upon the panel 17 is mounted mil-ammeter 28 which is connected in the magnet circuit through cable 24 brush 27, collector ring 26 to the central conductor 29 of cable 11. The conductor 29 of cable is insulated from the steel supporting strands 31 by flexible insulation 32 protected and made water and oil proof by coating 33, all completely enclosed and compacted by the steel strands 31. Conductor 29 is passed through the cable head 34, and connected to contact button 36 and insulated from the head by bakelite disc 37. The steel strands are frayed out in a conical shape within head 34 and held in place by molten zinc poured in to prevent the steel from pulling loose. Back of the bakelite disc 37 is poured molten insulating compound 38 to fill up all the voids and prevent water intrusion. Bakelite disc 37 is held in place by collar 39, screwed in tightly against it. The cable head is attached to the magnet proper by threads 41 screwed up tight to make a leak proof joint at shoulder 42. Thus the magnet may be unscrewed from the cable head without injuring the electrical connection, doing away with the necessity of changing the head on the cable when it is desirable to disconnect the magnet from the cable, in order to use different size magnets.

The magnet proper is made by taking outer pole 43 of soft steel and welding therein at 46 a spacer plate 44 of non-magnetic material, which spacer plate 44 is also welded to the center pole 47 of Norway iron at 48. Coil 49, which has previously been wound on spool 51, between end plates 52 of magnetic material and 53 of nonmagnetic material, with the winding entirely insulated from the spool, is placed over the core 47 and within the outer pole tube 43 so that one end of the coil is grounded to the iron core 47 at 54 and the other insulated end of the coil 56 is held out of the tube. The insulated end of coil 56 which was left longer than the total length of piece 12 is now pulled through hole 58 and soft steel piece 12 lowered into the tube 43 making a sliding fit with inner and outer pole at 57, until the coil is held firmly between plate 44 and piece 12. A ring weld is then made at 59 between the outer pole tube 43 and the head piece 12, not only holding the coil 49 firmly in position, but making it completely proof against the intrusion of fluid from the outside, no matter under what pressure. Non-magnetic sleeve or outer case 61 is then heated and shrunk on the outside with a shoulder contact at 62 and pinned on with pins 63. The advantages of a welded case for the coil are obvious, but in my construction the welds are made in such a manner that the heat used in welding does not injure or damage the insulation of the coil 49 or wire 56. A compressible contact is now made consisting of a long bolt 75 with threads at 76 and turned down to a smaller diameter at 63a being inserted through bakelite disc 78, and nut 71 and lock nut 71a being tightened to hold it in place. Wire 56 is soldered or attached to head 69. A compressible contact button comprising a sleeve 65 with slots 66 cut through and hole 77 bored in the center is then slipped over the end over coil spring 67 which is compressed and pin 64 inserted through the sleeve 65 and the slots 66. Bakelite disc 78 with compressible contact attached and assembled is now placed in position in bore 79 and dropped down until it engages a shoulder therein. Sleeve 72 is now screwed in at threads 73 and made tight with a socket wrench engaging collar in slots 74, so that no fluid could get around the bakelite disc 78 into the winding. As the magnet is screwed on to the cable head 34 at threads 41, against shoulder 42, contact button 36 engages the compressible contact button in the head and the spring 67 holds the contact tight and thus an insulated water tight circuit is made from the cable conductor to the end of coil at 56, through the coil to end 54 grounded on the steel body and the steel armor of the cable forming a steel return circuit for the magnet, the steel armor being grounded to the hoist on the truck.

The magnet is connected to the cable and arranged as in Fig. 2 over the casing in well 2. The magnet is lowered until the lower face 44 is level with the top of pipe 83, and the weight recorder and the measuring device set at "0" in the truck. The magnet is then energized by closing the D. C. switch on panel 17 and lowered into the hole. When it comes in contact with magnetizable loose piece 82 in the bottom of the well, the piece forms an armature and is held to the magnet, and at the moment of contact when the concentric poles are connected by the steel or iron piece, a momentary decrease in the resistance of the path of magnetic lines of force is had so that a momentary inrush of current is noted, and the needle 84 of ammeter 28 swings upward to 86, and then as the inrush of current has subsided and the coil draws its normal current, the needle 84 settles back to its normal position. Thus by noting the ammeter needle I am able to tell when the magnet has made contact with the fish and by reading the depth measuring device I am able to tell how deep it is. By cutting off the current and reading the weight indicator, I know the weight of the magnet and cable in the hole. By closing the switch and energizing the magnet and picking up the fish, and noting the weight I am able to tell the weight of the fish, which is very important when there are several pieces in the hole that may have become disengaged. The magnet is then pulled out of the hole and the pull noted, on the weight indicator. The fish may be stuck in the mud or caught under an obstruction and might pull loose from the face of the magnet, in which case there is a momentary decrease in current value as indicated by ammeter 28, and the needle 84 momentarily swings back to a position at 87, and then resumes its normal position. I can thus tell when the fish drops off by the ammeter, and also by the decrease in weight as shown by the weight indicator. Should the magnet be lowered against a non-magnetic obstruction such as a cave in, I am able to tell by the ammeter whether the obstruction is magnetic or non-magnetic, and can differentiate between, for example, collapsed pipe and a sand cave in, and also tell at exactly what depth the same occurs. Quite frequently a string of pipe is dropped in a well and may hang up before it touches bottom, and while the weight would be too great for the magnet to lift, by my method I can tell exactly the depth of the upper end. It will be noted that my magnet will operate at bottom hole temperatures without damage because there is no gas generated in its operation, and small air spaces take care of expansion due to heat without undue internal strains.

I am well aware that there are a great many uses for my invention in other operations such as submarine, and marine work, harbor and river construction, but I have shown only the preferred embodiment and its use in wells in the ground. With larger magnets and heavier cable, with more ampere-turns much heavier lifts could be made. I have also found the use of a flat face 44 on the magnet of value, because as it is spudded or lowered fast in fluid it deviates from a true downward motion, much as a coin dropped in water, and I am therefore able to get contact with the entire bottom of the hole larger in diameter than the magnet.

I claim:

1. A fishing magnet for wells comprising a head adapted to be connected with a supporting and conducting cable, an outer pole member fitting over the major portion of said head and protruding an approximately equal distance therebelow, an inner pole member engageable in the bottom of said head and protruding therebelow, non-magnetic sealing means bridging the outer extremities of said poles, a solenoid coil disposed between the protruding portions of the pole members, and a welded connection between the inner end of the fitted portion of the outer pole member and the head whereby said connection may be made at a point remote from the solenoid coil.

2. In a fishing magnet for wells the combination of a concentric pole structure having a solenoid coil mounted therebetween with a non-magnetic seal at the lower end of said structure, of a head slidable into said structure and connected thereto to confine the coil, said head having a passage therethrough adapted to receive a terminal wire of the coil, a compressible contact button in said passage connected with said wire and insulated from the head, and a combined supporting and conductor cable connected to said head with the conductor making contact with the button in the passage through the head.

3. A fishing magnet for wells comprising a concentric pole structure having a solenoid coil mounted therebetween with a non-magnetic seal at the lower end of said structure, a head for the magnet slidable into said structure and connected thereto to confine the coil, said magnet head having a passage therethrough, adapted to receive through its lower end a terminal wire from the coil, a compressible contact button in the passage connected with said wire and insulated from the head, and a connector head adapted to be secured to the terminal of a supporting and conductor cable engageable with the magnet head, said connector head closing the upper end of the passage through the magnet head and having a stationary contact button engageable with the compressible contact button in said passage.

4. A method of deep well fishing by means of a magnet lowered in a well hole by a single supporting and current conducting cable connecting the magnet with a surface source of current, including recording at the surface contact of the magnet with a magnetic object, cutting off the current to release the object, weighing the cable and magnet in the well, renewing engagement between the magnet and object by again supplying current to the magnet, and weighing the cable, magnet and object to determine the weight of said object.

5. A fishing magnet for wells including a pole and coil structure comprising a cylindrical outer pole, a concentric inner pole extending inwardly from one end to a point approximately midway of the outer pole, non-magnetic sealing means bridging the outer extremities of said poles, a solenoid coil disposed between the concentric portions of the poles, and a head for said coil and pole structure having a portion fitting in and filling the remaining portion of the outer pole to confine the coil and inner pole therein and connected by welding with the inner end of the outer pole.

WILFRED G. LANE.